United States Patent [19]  
Lewis et al.

[11] 3,744,294  
[45] July 10, 1973

[54] ACOUSTICAL TRANSDUCER CALIBRATING SYSTEM AND APPARATUS

[75] Inventors: Thomas L. Lewis; Robert B. Cohn, both of Lancaster, Calif.

[73] Assignee: The United States of America as represented by the Administrator of the National Aeronautics and Space Administration, Washington, D.C.

[22] Filed: Oct. 14, 1971

[21] Appl. No.: 189,290

[52] U.S. Cl. .......... 73/1 DV, 340/5 C, 179/175.1 A
[51] Int. Cl. ............................................. G01v 13/00
[58] Field of Search .......................... 73/1 DV, 4 R; 340/5 C; 179/175.1 A

[56] References Cited
UNITED STATES PATENTS 3,186,212  6/1965  Sharko .................................. 73/4 R
2,558,550  6/1951  Fiske ............................ 179/175.1 A Primary Examiner—S. Clement Swisher
Attorney—Darrell G. Brekke, John R. Manning et al.

[57] ABSTRACT

An acoustical transducer calibrating system including a differential pressure actuating device having an inner chamber for applying differential pressures to the transducer under test, and an outer chamber for vacuum sealing the device to the surface under test. Mounted within the inner chamber is an electrostatic actuator for exciting the transducer at selected frequencies so that its sensitivity can be determined for different operating ambient pressures.

7 Claims, 3 Drawing Figures

PATENTED JUL 10 1973　　　　　　　3,744,294
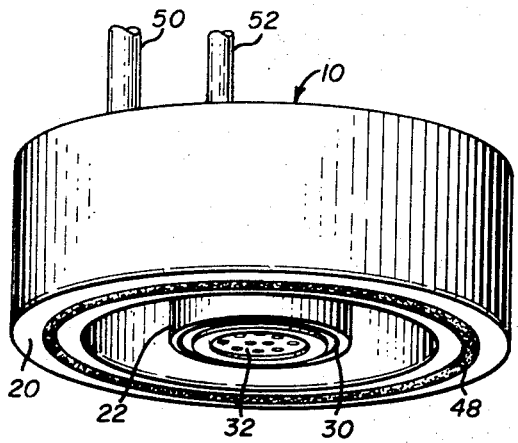
Fig_1
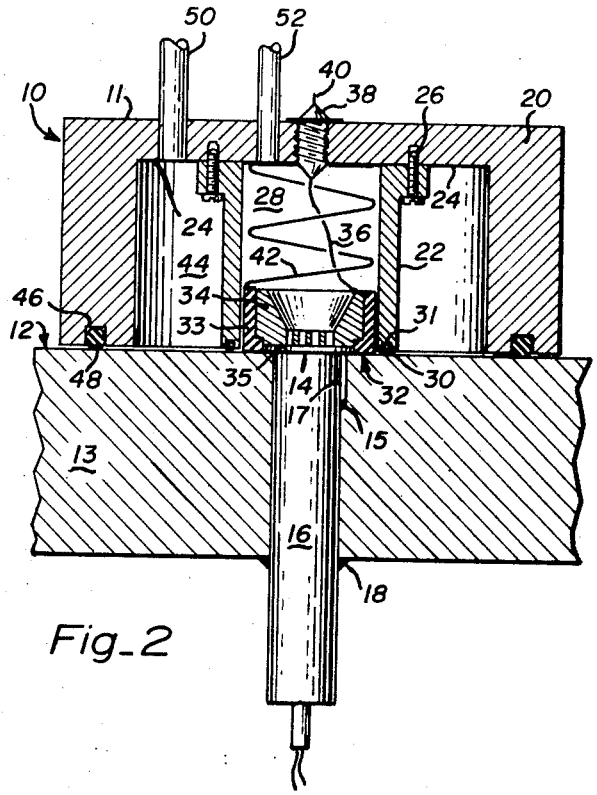
Fig_2
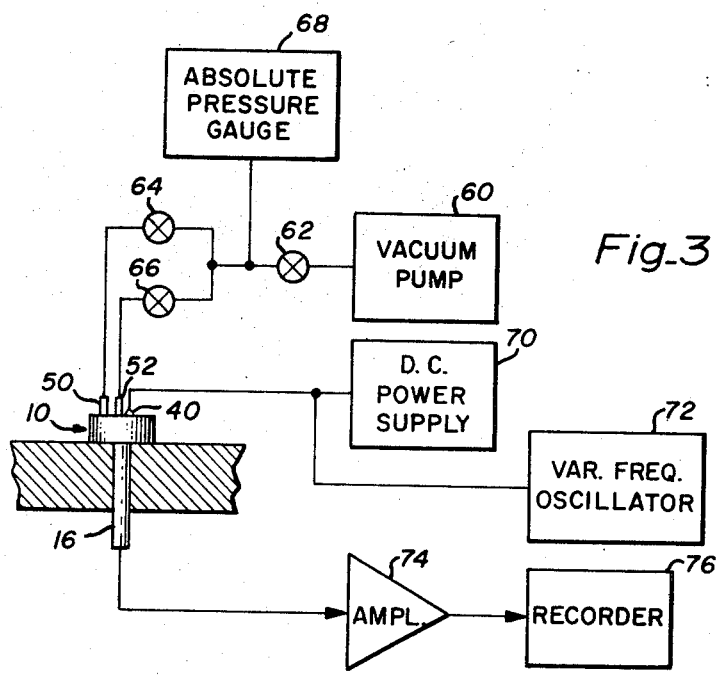
Fig_3
INVENTORS
THOMAS L. LEWIS
BY ROBERT B. COHN
ATTORNEY

ACOUSTICAL TRANSDUCER CALIBRATING SYSTEM AND APPARATUS

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates generally to apparatus for calibrating acoustical transducers and more particularly to an actuating device and associated calibrating system for determining the sensitivity of an installed acoustical transducer without requiring that it be removed from its mount.

2. Discussion of the Prior Art

In evaluating the aerodynamic characteristics of an aerodynamic surface, acoustical transducers are typically utilized to measure the effects of air flowing across the surface as evidenced by changes in surface pressure. The pressure responsive diaphragm of the transducers are usually mounted flush with the surface. Incorporated in some types of transducers is a small venting passage which allows the transducer to measure only the fluctuating portion of the surface pressure, since with venting there is no difference in static pressure across the diaphragm, i.e., there should be no difference in static pressure between the opposite surfaces of the diaphragm. Because of the amall size of these passages, there is a rather high likelihood that they will become blocked and thus affect the measurement provided by the transducer. Heretofore, in order to determine whether the passages were open so that proper venting occurred, the test surface was usually placed in a large laboratory vacuum chamber and small electrostatic devices were placed over the passages to provide calibrating excitation of the transducer. The venting check was made by reducing the pressure in the chamber, exciting the transducer with the electrostatic device and then noting its response as the chamber was allowed to return to atmospheric pressure.

In order to test the differential pressure sensitivity of the transducer, it was necessary to remove it from its mount. This was obviously a great disadvantage in that the removal was time consuming, and the removal and reinstallation of the transducer often caused damage to either the transducer or the mounting surface thereby making it difficult to obtain the required flushness and proper seal between the transducer and its mount.

SUMMARY OF THE PRESENT INVENTION

It is therefore an object of the present invention to provide means for calibrating acoustical transducers mounted in situ to an airfoil surface, or the like, and including a simple differential pressure actuating device that can be positioned on the test surface over the transducer so that a venting test as well as calibration of the transducer can be accomplished without either damaging the test surface or requiring removal of the transucer.

Briefly, the present invention includes a differential pressure actuating device for use with an appropriate enrgizing and detection system. The actuating device includes an inner housing providing an inner chamber for applying differential pressures at other than ambient static pressures, to the transducer under test, and an outer housing which cooperates with the inner housing to provide an outer chamber for vacuum sealing the device to the surface under test. Mounted within the inner chamber is an electrostatic actuator which is used to excite the transducer at selected frequencies so that the sensitivity of the transducer can be determined at various ambient static surface pressures.

Among the advantages of the present invention are that a transducer can be tested in situ and the time required to make the test is thus much shorter than was heretofore possible.

Other advantages of the present invention will no doubt become apparent to those skilled in the art after having read the following detailed description of a preferred embodiment which is illustrated in the several figures of the drawings.

IN THE DRAWINGS

FIG. 1 is a perspective view of a differential pressure actuating device in accordance with the present invention.

FIG. 2 is a cross section taken through a test surface and an actuating device of the type shown in FIG. 1.

FIG. 3 is a block diagram illustrating a calibration test system in accordance with the present invention.

DETAILED DESCRIPTION OF THE PREFERRED EMBODIMENTS

Referring now to the drawing, a preferred embodiment of a differential pressure actuating device 10 in accordance with the present invention is shown in perspective view in FIG. 1. In FIG. 2, a cross section of the device 10 is shown mounted to the surface 12 of a structure 13 which might for example be an aircraft wing or fuselage. Device 10 is positioned on surface 12 over the pressure sensitive end (diaphragm) 14 of an acoustical transducer. Transducer 16 is hermetically sealed to structure 13 at 18. A venting passage 15 is provided in structure 13 in registry with a venting hole 17 in transducer 16 to permit static pressure equalizations of both the interior and exterior surfaces of the pressure sensitive diaphragm of transducer 16.

Actuator device 10 includes a cylindrical cup-shaped outer housing 20 having a cylindrical inner housing 22 concentrically disposed therewithin and sealingly affixed to its inner wall 24 by the bolts 26. The inner wall of housing 22 and the centermost portion of wall 24 form a cylindrical calibration chamber 28 which is open at the lower end. An O-ring seal 30 is mounted within an annular groove 31 at the lower end of housing 22 for sealingly engaging the test surface 12.

Mounted within chamber 28 is an electrostatic actuator 32 such as the Model UA0023 manufactured by Brel & Kjaer. Actuator 32 includes an insulative annular sleeve 33 which electrically isolates the electrostatic electrode 34 from the inside wall of inner housing 22. Sleeve 33 is held firmly (with approximately 2 lbs. of force) against the surface 12 by a spring 42, but the electrostatic electrode 34 is spaced from the transducer diaphragm by an air gap 35 of approximately 0.005 inch. Electrical contact to actuator 32 is made through a conductor 36 which extends upwardly through an insulator 38 to provide an external contact terminal 40.

The inner walls of outer housing 20 and the outer walls of inner housing 22 cooperate to form an outer vacuum chamber 44 which is used to secure the device to surface 12. Outer housing 20 is provided with an annular groove 46 for receiving an O-ring 48 for sealingly engaging surface 12. Exhaust tubes 50 and 52 form exhaust passages extending through housing 20 into chambers 44 and 28, respectively, so that the pressure therewithin can be reduced by an external vacuum pump. When the device is positioned on surface 12, as illustrated in FIG. 2, and the pressure within chamber 44 is reduced, the imbalance in pressure between the top surface 11 and surface 24 of outer housing 20 causes the device to be forced onto the surface 12. This force along with the frictional resistance to lateral motion provided by O-rings 30 and 48 insures that device 10 is secured to surface 12. O-ring 30 seals off inner chamber 28 so that the pressure therewithin is completely independent of that in chamber 44. Actuator electrode 34 has openings 35 therethrough so that when the pressure within chamber 28 is reduced, the communication passages 14 cause the pressure at the diaphram 14 of transducer 16 to likewise be reduced (these holes are also an inherent part of the electrostatic actuator).

Alternating current and direct current signals are applied to terminal 40 to cause an alternating electrostatic force to be developed across the air gap 35 separating electrode 34 and the transducer diaphram 14. The electrostatic force cause pressure variations at the AC signal frequency which are detected by transducer 16.

In FIG. 3 of the drawings, a calibration test system including the actuating device 10 is illustrated in block diagram form. The system includes a vacuum pump 60 which is coupled through a main cut-off valve 62 and a pair of individual cut-off valves 64 and 66 to the exhaust tubes 50 and 52 respectively. An absolute pressure gauge 68 is also provided between valves 64–66 and valve 62 for indicating the vacuum drawn by pump 60. A DC power supply 70 and a variable frequency oscillator 72 are electrically connected to terminal 40 for energizing the electrostatic actuator 32. The output of transducer 16 is amplified by an amplifier 74 and the amplified signal is recorded by a recorder 76 which may include a meter, chart or tape recorder.

In operation, calibrating device 10 is positioned on surface 12 as indicated in FIGS. 2 and 3, and valves 62 and 64 are opened while valve 66 is closed. Pump 60 is then energized to begin reducing the pressure in outer vacuum chamber 44 so as to secure device 10 in place on surface 12 and at the same time form a seal for inner chamber 28. When the pressure within chamber 44 has been reduced to approximately 8 pounds per square inch, as indicated by pressure gauge 68, valve 64 is closed and valve 66 is opened so that inner vacuum chamber 28 can be exhausted. After the pressure in chamber 28 has been reduced to a selected value, electrostatic actuator 32 is energized with a one volt potential from the DC power supply 70 and a 1 volt AC potential (at a selected frequency) from the variable frequency oscillator 72.

The frequency of the output signal developed by oscillator 72 is then swept over a test range, such as between 20 hertz and 20,000 hertz, and the amplified output of transducer 18 is recorded by recorder 76. The amplitude of the recorded signal provides a clear indication of the sensitivity of transducer 18 at the selected pressure. The pressure within chamber 28 is then changed and the test repeated, and so forth. Since inner chamber 28 is completely independent from outer chamber 44, the pressure within inner chamber 28 can be changed to any selected pressure so as to enable the sensitivity of transducer 18 to be determined at any number of pressure levels. When actuator 32 is energized at a single selected frequency, the recorded output will indicate whether proper venting has occured, the sensitivity of the transducer 16 at the selected frequency, and the pressure within inner chamber 28.

Although the actuating device of the present invention has been disclosed in a form primarily suited for application to planar, or near planar, surfaces, it will be appreciated that the configuration of housings 20 and 22 can be appropriately modified to fit any of the various curved surfaces used to form airfoils. It will also be appreciated that the size of outer housing 20 can be increased and its configuration modified so that a number of inner housings 22 can be positioned therein for the purpose of simultaneously calibrating more than one transducer at a time.

Whereas the present invention has been described in terms of a single preferred embodiment, it is contemplated that numerous modifications thereof will be apparent to those skilled in the art. Accordingly, it is intended that the appended claims not be limited by the above disclosure, but be interpreted as covering all such alterations and modifications as fall within the true spirit and scope of the invention.

What is claimed is:

1. Apparatus for calibrating an acoustical transducer communicatively mounted to a surface, comprising:
   an actuating device including means forming a first chamber having a first opening on one side with sealing means disposed thereabout for sealingly engaging said test surface, means disposed within said first chamber for developing acoustical forces for exciting said transducer, and means for securing said actuating device to said surface;
   means for selectively changing the pressure within said first chamber; and
   means responsive to the output of said transducer and operative to indicate its response to said acoustical forces.

2. Apparatus for calibrating an acoustical transducer as recited in claim 1 and further including means for selectively changing the pressure within said first chamber.

3. An actuating device for calibrating an acoustical transducer communicatively mounted to a surface, comprising:
   means forming a first chamber;
   means forming a second chamber disposed about said first chamber, said first and second chambers having openings on a common side with sealing means disposed about the openings for sealingly engaging said surface;
   means for reducing the pressure within said second chmaber whereby a vacuum seal is provided about said first chamber for securing the actuating device to said surface;
   acoustical force generating means disposed within said first chamber for exciting said transducer; and
   means for selectively changing the pressure within said first chamber.

4. An actuating device for use in calibrating an acoustical transducer communicatively mounted to a surface, comprising:

first housing means forming an inner chamber having a first opening on one side with sealing means disposed thereabout for sealingly engaging said surface;

second housing means disposed in cooperating relationship with said first housing means to form an outer chamber having a second opening circumscribing said first opening, said second housing means having sealing means disposed about said second opening for sealingly engaging said surface;

acoustic force generating means disposed within said inner chamber for exciting said transducer; and means for changing the pressure within said inner and outer chambers.

5. An actuating device for use in calibrating an acoustical transducer as recited in claim 4 wherein said force generating means includes an electrostatic actuator.

6. An actuating device for use in calibrating an acoustical transducer as recited in claim 4 wherein said means for changing allows the pressure within said inner chamber to be changed independent of the pressure within said outer chamber.

7. An actuating device for use in calibrating an acoustical transducer, comprising:

a cylindrical outer housing;

a cylindrical inner housing disposed concentric with said outer housing and cooperating therewith to form an inner chamber and an outer chamber both of which have openings at one end;

sealing means disposed about each of said openings for sealingly engaging a surface to which said transducer is communicatively mounted;

acoustic force generating means disposed within one of said chambers for exciting said transducer; and means forming exhaust passages through which said inner and outer chambers may be evacuated.

* * * * *